United States Patent [19]

Henderson et al.

[11] Patent Number: 5,069,690
[45] Date of Patent: Dec. 3, 1991

[54] PROCESS FOR KINETIC GAS-SOLID CHROMATOGRAPHIC SEPARATIONS

[75] Inventors: Philip B. Henderson, Wescosville; Charles G. Coe, Macungie; Donald E. Fowler, Allentown; Montford S. Benson, Wescosville, all of Pa.

[73] Assignee: Air Products and Chemicals, Inc., Allentown, Pa.

[21] Appl. No.: 660,474

[22] Filed: Feb. 21, 1991

[51] Int. Cl.$^5$ ................ B01D 15/08; B01D 53/04
[52] U.S. Cl. ........................... 55/67; 55/71; 55/75
[58] Field of Search ............. 55/67, 71, 75, 197, 55/386; 423/240 S, 406, 489

[56] References Cited

U.S. PATENT DOCUMENTS

| | | | |
|---|---|---|---|
| 3,125,425 | 3/1964 | Richmond | 55/22 |
| 3,181,305 | 5/1965 | Schoenfelder | 62/12 |
| 3,224,167 | 12/1965 | Jones | 55/71 X |
| 3,263,488 | 8/1966 | Martin | 55/197 X |
| 4,156,598 | 5/1979 | Woytek et al. | 55/68 |
| 4,193,976 | 3/1980 | Lileck et al. | 423/406 |
| 4,744,805 | 5/1988 | Maroulis et al. | 55/67 X |
| 4,747,854 | 5/1988 | Maroulis et al. | 55/67 X |
| 4,772,296 | 9/1988 | Potts | 55/67 |
| 4,933,158 | 6/1990 | Aritsuka et al. | 423/406 X |
| 4,943,304 | 7/1990 | Coe et al. | 55/71 X |
| 4,975,259 | 12/1990 | Hyakutake et al. | 55/71 X |
| 4,980,144 | 12/1990 | Koto et al. | 423/406 |

FOREIGN PATENT DOCUMENTS

| | | | |
|---|---|---|---|
| 0692119 | 8/1964 | Canada | 55/197 |
| 785747 | 5/1968 | Canada | |
| 0189607 | 8/1986 | European Pat. Off. | 55/197 |
| 0366078 | 5/1990 | European Pat. Off. | |

OTHER PUBLICATIONS

Spears, et al; "Analysis of $F_2$, $NF_3$, $t$-$N_2F_2$, and $N_2F_4$ Mixtures by Gas Chromatography", *Journal of Gas Chromatography*, vol. 6; Jul. 1968; pp. 392-393.
Yang; R. T.; "Gas Separation by Adsorption Processes"; p. 213.
Ruthven, D. M.; "Principles of Adsorption and Adsorption Processes"; ch. 10, Chromatographic Separation Processes, p. 325.
Tochilorskaya, et al; Grozen. Neft. Nausch, Issled, Inst. No. 25, 82-90.
J. Karger, et al; *Zeolites*; vol. 9; (1989); pp. 267-281.
J. Karger, et al; *Zeolites*; vol. 6; (1986); pp. 146-150.
J. Karger, et al; *Zeolites*; vol. 7; (1987); pp. 90-107.
J. Karger, et al; *Zeolites*; vol. 7; (1987); pp. 282-285.

*Primary Examiner*—Robert Spitzer
*Attorney, Agent, or Firm*—Geoffrey L. Chase; James C. Simmons; William F. Marsh

[57] ABSTRACT

A method is disclosed for the kinetic separation of gas mixtures using gas-solid chromatography. More specifically, a method is disclosed for the kinetically driven gas-solid chromatographic separation of $NF_3$ from $CF_4$ in significant volumes over a specific class of adsorbents to recover $NF_3$ at high purities, such as 99.99% $NF_3$.

18 Claims, 8 Drawing Sheets

NF$_3$ PURIFICATION SYSTEM

PROCESS FOR KINETIC GAS-SOLID CHROMATOGRAPHIC SEPARATIONS

TECHNICAL FIELD

The present invention is directed to purifying a crude first component containing a second component impurity to produce ultra high purity first component using kinetic gas-solid chromatography. More specifically, the present invention is directed to purifying $NF_3$ of contaminant $CF_4$ using kinetically driven gas-solid chromatography in a continuous and preparatory process.

BACKGROUND OF THE PRIOR ART

Nitrogen trifluoride ($NF_3$) is a highly valued material and fluorine source that has found value in the electronics fabrication industry primarily as an etchant for the production of nano-scale geometries in electronic devices and as a cleaning medium for fabrication equipment. As with all electronic materials, the industry is driven to seek increasingly purer $NF_3$ for use in its production facilities. For some applications, purities as high as 99.999% $NF_3$ are desired.

Carbon tetrafluoride ($CF_4$) is a typical contaminant found in many synthetic routes to the production of $NF_3$. The removal of $CF_4$ from $NF_3$ by conventional separation methods, such as distillation and bulk absorption, is not possible due to the similar boiling points, molecular sizes and heats of adsorption of $CF_4$ and $NF_3$. The contamination of $NF_3$ with $CF_4$ is a particular problem for the electronics industry due to the potential for carbon deposition in the nano-scale geometries of electronic devices.

Purification techniques for $NF_3$ are known in the prior art. For instance, U.S. Pat. No. 4,156,598 discloses a technique for removing $N_2F_2$ from $NF_3$ by contacting the $NF_3$ and $N_2F_2$ containing gas with a nickel catalyst and subsequent adsorption of $N_2F_2$ by-products on zeolitic adsorbents. Removal of $CF_4$ is not discussed. U.S. Pat. No. 4,193,976 discloses a defluorination process for purifying $NF_3$ of $N_2F_2$ using nickel catalysts. The presence of $CF_4$ is identified at Col. 4, line 58, and Example 3 suggests that the use of 5A zeolitic molecular sieve is inappropriate as a purification agent due to the high degradation of the desired $NF_3$.

In light of the close boiling points of $NF_3$ ($-129°$ C.) and $CF_4$ ($-128°$ C.), distillation techniques for bulk recovery of high purity $NF_3$ from $CF_4$ are not viable. Distillation of $NF_3$ from other compounds is readily recognized, such as demonstrated in U.S. Pat. No. 3,181,305 wherein $NF_3$ is distilled from nitrous oxide and tetrafluorohydrazine. In addition, the dipole moments and the heats of adsorption of $NF_3$ and $CF_4$ are sufficiently close so that bulk recovery of $NF_3$ from conventional bulk adsorption technologies would not be feasible.

Analytical gas chromatography for the determination of $NF_3$ among other fluorine-containing compounds has been disclosed in an article "Analysis of $F_2$, HF, $NF_3$, t-$N_2F_2$, and $N_2F_4$ Mixtures by Gas Chromatography" by Larry G. Spears, et al., appearing in the Journal of Gas Chromatography, Vol. 6, July 1968, pp. 392 and 393.

U.S. Pat. No. 4,772,296 discloses a preparative gas chromatography technique for preparing electronic industry level purities of various Group 3 and Group 5 elements and their halides. Nitrogen halides are contemplated. The separation is performed on a chromatographic column packed with porous polymer such as "Poropak".

More specifically, U.S. Pat. No. 3,125,425 discloses that $CF_4$ may be separated from $NF_3$ by gas chromatography in which a perhalogenated polymer is coated on silica gel as the chromatographic adsorption medium. This constitutes gas-liquid equilibrium chromatography, wherein the gas is the $CF_4$ and $NF_3$ and the liquid is the polymer coating on the silica gel support. High speeds of operation are specifically disclosed at Col. 4, lines 19 through 21.

These chromatographic techniques operate on an equilibrium basis. In an equilibrium chromatographic separation, the absorbent over the length of the chromatographic bed acts as an infinite series of distillation trays or adsorption sites at which the various components of the gas to be resolved equilibrate with regard to their individual adsorption characteristics. The chromatographic process carrier gas sweeps the gas species of the feed gas over the length of the adsorbent in the chromatographic column to present the gas elements to each stage of the adsorbent and the chromatographic column. However, under equilibrium conditions of operation, such chromatographic separations will be difficult in producing bulk or volumetric quantities of the gas species to be separated if the heats of adsorption of individual gas species are closely matched, resulting in poor resolutions, poor purities, slow processing times and/or significant sizing of equipment for bulk high purity separations.

The equilibrium nature of preparative gas chromatography is substantiated by the literature reference "Gas Separation By Adsorption Processes" by Ralph T. Yang at page 213, wherein it is stated, "The high separating efficiency of chromatography as compared to adsorption processes is caused by the continuous contact and equilibration between the gas and sorbent phases. Each contact is equivalent to an equilibrium stage or theoretical plate." At page 214 of the same literature, it is stated, "In the plate theory, the column is thought to consist of a finite number of hypothetical stages, and equilibrium is attained in each stage."

Additionally, in the literature reference titled, "Principles of Adsorption and Adsorption Processes," by Douglas M. Ruthven, in Chapter 10 on "Chromatographic Separation Processes," at page 325, it is stated, "The separating power of a chromatographic process arises because during passage through the column, each molecule of an adsorable species is equilibrated many times between the mobile and stationary phases. Each equilibration is equivalent to one 'equilibrium stage' or 'theoretical plate'."

Canadian Patent 785,747 discloses hydrothermally treated Na A zeolite to remove water from freons.

Hydrothermal stability of A-type zeolites was reported on in the literature, but the materials had no applicability when reproduced for use by the present inventors for the present invention, E. G. Tochilorskaya et al; Grozen. Neft. Nausch, Issled. Inst., No. 25,82-90.

Diffusion studies on 4A and 5A zeolites have been conducted regarding adsorbed molecules, J. Karger et al., Zeolites, Vol. 9, (1989) pp 267-281; J. Karger et al., Zeolites, Vol. 6, (1986) pp 146-150; J. Karger et al., Zeolites, Vol. 7 (1987) pp. 90-107.

Structural changes during pore closure of zeolites have been studied for 4A and 5A zeolites as reported in J. Karger et al., Zeolites, Vol. 7 (1987) pp. 282–285.

European Appln. 0 366 078 discloses the purification of $NF_3$ from $N_2O$, $CO_2$ and $N_2F_2$ using thermally treated zeolites. The process is an equilibrium adsorption, and no restriction is placed upon the zeolitic pore size.

The prior art demonstrates that various techniques for $NF_3$ purification have been attempted and that $CF_4$ is a known contaminant of $NF_3$, which has been traditionally resolved using equilibrium based chromatography and, more specifically, by equilibrium based gas-liquid chromatography. Such equilibrium based separations suffer from disadvantages of efficiency when bulk or volume purifications to high purity levels are desired. The present invention overcomes these drawbacks of the prior art as will be set forth in greater detail below.

BRIEF SUMMARY OF THE INVENTION

The present invention is a method of recovering a purified first component from a mixture of at least first component and second component using gas-solid chromatography comprising passing discrete pulses of a mixture of the first and second component in a continuous flow of an inert carrier gas through a bed of porous adsorbent that kinetically adsorbs one component more readily than the other component and having an effective pore window sufficient for kinetic differentiation of the components at an appropriate mass velocity for a kinetic separation and separately recovering the first component from the bed as product first component having a reduced content of the second component.

Preferably, the present invention is a method for separately recovering $NF_3$ and/or $CF_4$ from a mixture of $NF_3$ and $CF_4$ comprising passing a mixture of $NF_3$ and $CF_4$ in an inert carrier gas through a zone of porous adsorbent that differentially adsorbs and separates $NF_3$ from $CF_4$ having an effective pore window larger than that of sodium-exchanged zeolite A, commonly referred to as 4A molecular sieve, and smaller than that of calcium-exchanged zeolite A, commonly referred to as 5A molecular sieve, at a mass velocity of at least 1.0 g/sq cm-hr and a zone temperature less than approximately 100° C. and separately recovering $NF_3$ and/or $CF_4$ from the zone, each having a reduced content of the other component.

Preferably, the mixture of $NF_3$ and $CF_4$ are passed through the zone in discrete pulses in a continuous flow of the carrier gas.

Preferably, the adsorbent is a hydrothermally pretreated 5A zeolitic molecular sieve. Alternatively, the adsorbent is a chabazite.

Preferably, the separation is conducted under conditions by which a kinetic mechanism of the relative adsorption of the $NF_3$ and $CF_4$ on the adsorbent is performed.

Preferably, the effective pore window is approximately 4.4 Å to 4.8 Å.

Preferably, the effective pore window is approximately 4.6 Å.

Preferably, the zone temperature is in the approximate range of 0° C. to 60° C.

Preferably, the zone temperature is approximately 30° C.

Preferably, the mass velocity is in the range of 2.5 to 8.6 g/sq cm-hr.

Preferably, the purity of the recovered $NF_3$ is at least 99.99% $NF_3$.

Preferably, the purity of the recovered $CF_4$ is at least 99.99% $CF_4$.

Preferably, the 5A zeolitic molecular sieve is hydrotreated by soaking in water, superficially drying at <80° C. to remove surface water and then heating in an inert atmosphere at approximately 300° C. for approximately 16 hours.

Preferably, the inert carrier gas is selected from the group consisting of helium, hydrogen, argon, and nitrogen.

Preferably, the recovered $NF_3$ is conducted through one or more additional passes of such adsorbent.

Preferably, the recovered $CF_4$ is conducted through one or more additional passes of such adsorbent.

More specifically, the present invention is directed to a method of recovering purified $NF_3$ from a mixture of $NF_3$ and $CF_4$ using gas-solid chromatography comprising passing discrete pulses of a mixture of $NF_3$ and $CF_4$ in a continuous flow of an inert carrier gas through a bed of porous adsorbent, that kinetically adsorbs $NF_3$ more readily than $CF_4$, selected from the group consisting of hydrothermally pretreated 5A zeolitic molecular sieve and chabazites, and having an effective pore window in the range of 4.4 to 4.8 Å, at a mass velocity of 2.5 to 8.6 g/sq cm-hr and a zone temperature in the range of 0° C. 60° C. and separately recovering the $NF_3$ from the bed as product $NF_3$ having a purity of at least 99.99% $NF_3$.

DETAILED DESCRIPTION OF THE INVENTION

It has been unexpectedly ascertained that $NF_3$ can be highly resolved in bulk or volume quantities from $CF_4$ despite the closely similar characteristics of the two species of such gas mixture by operating a gas-solid chromatography process under conditions and with appropriate adsorbents so as to effect separation utilizing a kinetic mechanism in contrast to an equilibrium mechanism. The chromatographic separation allows for the processing of bulk quantities of $NF_3$ contaminated with $CF_4$ at high flow rates and conditions which favor the retention and stability of NF$_3$, while minimizing the capital expense in successfully processing bulk or volume quantities of NF$_3$ to purities necessary, for instance for the electronics industry, of up to 99.999% NF$_3$ and higher.

More specifically, the present invention is an improvement of the process of preparative gas chromatography for removing CF$_4$ from NF$_3$ whereby a hydrothermally treated 5A zeolitic molecular sieve is used as the chromatographic adsorbent. When a 5A zeolitic molecular sieve, which has not been hydrothermally treated according to the present invention is used, it does not provide acceptable separation of CF$_4$ from NF$_3$.

Another genus of adsorbents which unexpectedly give a large CF$_4$—NF$_3$ separation are chabazites. Isotherm measurements have shown that CF$_4$ adsorbs about as strongly on chabazite as does NF$_3$, yet during the preparative gas chromatography adsorption process of the present invention, the CF$_4$ adsorption is prevented, thus affording a large CF$_4$—NF$_3$ separation. Appropriate chabazites are mentioned in U.S. Pat. No. 4,732,584, which is hereby incorporated in its entirety by reference herein. Chabazites are a naturally occurring small pore zeolite which has a three dimensional channel system and three-fold symmetry. The structure consists of stacked, double six ring prisms (D6R units) interconnected through four rings producing a cubic close-packed structure. The layers of six rings are linked by tilted four rings producing a highly porous structure. Chabazite is one of the most porous natural zeolites known and has a void volume of 0.47 cc/cc. Chabazite has a typical unit cell composition of $Ca_2(Al_4Si_8O_{24})\cdot 13 H_2O$ with Si/Al ratios from 1.6 to 3.0. Although natural chabazites usually have the majority of extra framework cations as either calcium or strontium, sodium and potassium forms are also known. Chabazites can be found in many parts of the world and are fairly common. A thorough listing of various localities can be found in Gottardi and Galli's text, "Natural Zeolites," published by Springer-Berlag, New York, 1985, and references therein. Chabazites may be found in either sedimentary or volcanic deposits. Sedimentary chabazites are common and occur in medium or high grade ores in the western United States. Most sedimentary chabazites contain various amounts of clinoptilolite, erionite and mordenite. In some cases, these contaminant zeolitic phases are not detected by X-ray and can greatly complicate the interpretation of experimental results. In this invention, chabazite is meant to include a large number of synthetic zeolites having the chabazite topology and included under the general IUPAC structure code of chabazite (CHAB). These phases could have minor variations in their crystal structure.

Dehydration of the chabazite to a level of optimum performance can be carried out by any method which will remove the water from the zeolite cavity, including water surrounding the cations, without causing the collapse of the zeolite structure. To achieve this in a practical manner, the chabazite can be maintained at a temperature in the range of 250°–500° C. under any conditions suitable to lower the water content of the zeolite to less than about 1.5% without causing structural damage to the zeolite.

Normally, zeolite A is synthesized in the sodium form and has the typical unit cell composition of $Na_{12}Al_{12}Si_{12}O_{48}\cdot 27H_2O$ in the hydrated state. The structure of zeolite A consists of sodalite cages (sometimes referred to as cubo-octahedron) linked together through the four membered prisms to form an open framework structure. Zeolite A is included under the general IUPAC structure code of Linde type A (LTA). Upon dehydration, zeolite A will adsorb differently-sized molecules depending on its cation form. Access to the pores in zeolite A is restricted by 8-membered rings and has a free aperture of 4.3 Å. However, in the sodium form it is known that the sodium ions partially block the eight-ring, reducing its effective diameter. This change in pore size allows different ion forms of zeolite A to adsorb differently-sized molecules. In the pure sodium form (i.e. 4A), zeolite A is known to exclude molecules at ambient temperature which are larger than ethylene (3.9 Å) or methane (3.8 Å). Replacing approximately 60% of the sodium with calcium results in an adsorbent referred to as 5A and increases the effective diameter so that n-paraffins (4.3 Å) can be adsorbed under the same conditions. It is well known that this change in pore size is the basis for separating linear hydrocarbons from branched and cyclic isomers.

The process of the present invention is an improvement on the known methods of preparative gas chromatography so that CF$_4$ is removed from NF$_3$ more efficiently, at higher levels of NF$_3$ purity and for bulk or volume separations. This improvement came about from the recognition of a more favorable mode of separation using kinetic mechanisms, and the development of a class of adsorbents represented by several species of such adsorbent which strongly adsorb NF$_3$, but do not adsorb CF$_4$ under the kinetic mechanism process conditions. Both hydrothermally treated 5A zeolitic molecular sieve and chabazites unexpectedly do not adsorb CF$_4$ under the chromatographic conditions of the present invention despite isotherm data which clearly shows significant CF$_4$ adsorption at equilibrium conditions. Because preparative gas chromatography is generally regarded, and art recognized, as an equilibrium process, the results of the present invention were unexpected.

The problem with developing adequate separatory processes for purifying NF$_3$ of contained CF$_4$ is represented by the characteristics listed in Table 1 below for the various molecules.

TABLE 1

| Physical Property | CF$_4$ | NF$_3$ | Comments |
|---|---|---|---|
| Boiling Point | −128° C. | −129° C. | Relative volatility <1.01 |
| Molecular Size | 4.8 Å | 4.5 Å | CF$_4$ larger than NF$_3$, thus a conventional bulk adsorption based on a kinetic separation not possible. |
| Dipole Moment | 0.0 D | 0.235 D | CF$_4$ dipole moment is lower than that for NF$_3$, thus the heat of adsorption of CF$_4$ will be the same as or lower than that for NF$_3$. This makes a conventional bulk adsorption based on an equilibrium separation not possible. |

As noted in Table 1, the close boiling points of NF$_3$ and CF$_4$ preclude the effective use of distillation to effect bulk separation of these compounds in large volumes and high purities. Additionally, the close molecular sizing of the molecules of $NF_3$ and $CF_4$ tend to discourage use of conventional bulk adsorption techniques, particularly in light of the fact that the $NF_3$ is the desired product and would be preferentially adsorbed on a kinetic basis over $CF_4$. The fact that the dipole moment of $CF_4$ is less than $NF_3$ and thus the heat of adsorption of $CF_4$ will be the same as or lower than $NF_3$ makes conventional bulk adsorption based on equilibrium separations unrealistic. Computer distillation simulations show that the separation factor for an $NF_3$—$CF_4$ distillation is <1.01. $CF_4$ has reaction chemistry at temperatures below the $NF_3$ decomposition temperature and, thus, $CF_4$ cannot be reacted out of $NF_3$. Therefore, traditional modes of purification of $NF_3$ from contaminant $CF_4$ did not appear to be viable for high purity bulk separations despite the past experience of analytical chromatography to be used for $NF_3$—$CF_4$ detection. In fact, Porapak Q, a porous polymer adsorbent, is the adsorbent used in the quantitative gas chromatographic analysis of $CF_4$ and $NF_3$. The $CF_4$ appears as a shoulder to the large $NF_3$ peak and, although this separation is adequate for quantitative analysis, it is not a large enough separation for an efficient bulk gas purification process at high purities.

The present inventors have unexpectedly ascertained that the selection of adsorbents and conditions of gas-solid chromatographic separation provide a unique opportunity to separate $NF_3$ from $CF_4$ by a kinetic mechanism unappreciated in preparative gas chromatography in the past. This unique kinetic mechanism of separation is affected by maintaining conditions in a gas-solid chromatographic packed column on appropriate adsorbents such that the species $CF_4$ and $NF_3$ interact substantially on a kinetic basis with the adsorbent material as the gas species are carried through the chromatographic bed or zone of adsorbent by an inert carrier gas such as helium, argon, hydrogen, nitrogen. One parameter which allows for this kinetic mechanism to be affected includes operation over an adsorbent having an effective pore window preferably in the range of approximately 4.4 to 4.8 Å. The effective pore window for the adsorbent of this invention has been determined to be in the range of 4.4–4.8 Å by an accepted method using molecular probe molecules of different sizes (D. W. Breck, *Zeolite Molecular Sieves*, John Wiley (1974)). It has been shown that using plug gauge molecules is the best way of obtaining the pore sizes of zeolites. Using the critical diameter (i.e. Lennard-Jones kinetic diameter calculated from the minimum equilibrium cross-sectional diameter) of various probe molecules, one can define a meaningful scale of micropore size which is well accepted (D. H. T. Spencer, *Porous Carbon Solids*, Ed. R. L. Bond, Academic Press NY (1967). Another parameter which allows for this kinetic mechanism to be affected includes conducting the flow of $CF_4$ and $NF_3$ in an inert carrier gas through the chromatographic bed or zone of adsorbent at a mass velocity of approximately 2.5 to 8.6 g/sq cm-hr at the inlet to the column. The temperature of the kinetic chromatographic separation should be in range of approximately 0° C. to 60° C. Preferably, the effective pore window is approximately 4.6 Å. The preferred temperature of operation is approximately 30° C. The preferred mass velocity is preferably approximately 8.6 g/sq cm-hr. Experience has shown that under these conditions, the process of this invention typically removes 98% of the $CF_4$ present in the feed. Depending on the initial concentration of $CF_4$ in the $NF_3$, it may be necessary to use multiple stages or passes of the process to obtain the desired purity. As set forth with greater particularity in the examples below, the present inventors have ascertained that a specific pretreatment of 5A zeolitic molecular sieve provides a desirable kinetically operating adsorbent, as well as various chabazites which provide a similar kinetic-based mechanism operation in the process of the present invention.

Using the chosen adsorbents of the present invention under the conditions set forth above for the kinetic mechanism of chromatographic separation, the process of the present invention can be illustrated with reference to FIG. 1. A source of $NF_3$ contaminated with $CF_4$ 10 feeds such gas in line 12 to be mixed with an inert carrier gas source such as helium 14 which is administered in line 16. The combination of $NF_3$ and $CF_4$ in line 12 and helium carrier gas in line 16 results in a feed 18 to the chromatography bed or zone 20 packed with an appropriate kinetically operating adsorbent of the present invention. The helium carrier gas flows in a continuous manner through the bed 20, while the $NF_3$—$CF_4$ mixture 10 is pulsed in discrete injections into the continuous flow of carrier gas in a time sequence which allows for the $NF_3$ and $CF_4$ to resolve over the bed adsorbent without interfering with separate pulses of the feed gas. The resolved $CF_4$ and $NF_3$ exit column 20 in line 22 in discrete portions predicated upon the pulses and the resolution power of the bed 20 operating under a kinetic mechanism of separation and based upon detection of $CF_4$ and $NF_3$ in the carrier gas flowing through line 32 by a thermal conductivity detector 30. The $NF_3$ is separately collected as it comes off bed 20 by appropriate valve switching and passage through line 24 and condensation in cryogenic collection system 26 to result in 99.99% $NF_3$. The carrier gas is removed in line 28 and those detected portions of the $CF_4$ can be separately removed in line 34. A sidestream of carrier gas in line 36 passes through the thermal conductivity detector 30 and vents in line 38.

A new adsorbent has been prepared by the hydrothermal treatment of 5A molecular sieve which has a smaller effective pore size than conventional 5A molecular sieve. Using conventional 5A molecular sieve, $CF_4$ and $NF_3$ have similar retention times much like what is observed using Porapak Q. Using the hydrothermally treated 5A molecular sieve, the effective pore size is reduced sufficiently so that $CF_4$ is no longer adsorbed into the zeolite crystal under the process of this invention; but still large enough to adsorb $NF_3$, which has a smaller molecular size than $CF_4$. The net result is that $CF_4$ elutes very quickly and $NF_3$ is greatly retained allowing for the preparative gas-solid chromatographic purification to be a viable separation method. The hydrothermal treatment can be accomplished in two ways. A flow method involves wetting the 5A molecular sieve so that it contains 12–26% (preferably 16–21%) water by weight. The wetted adsorbent is then packed in a column. While a low mass velocity of 0.04 g/sq cm-hr of helium is passed through the column, the column is heated to 300° C. with a fast temperature ramp rate (approximately 15° C./minute). The temperature is held at 300° C. for several hours until all the water has been purged off the column. A static method is done by wetting 5A molecular sieve so that it contains 6–11% water by weight. The wetted sieve is placed in a stainless steel bomb which is evacuated down to 0.1 torr pressure. The bomb is sealed and heated to 300° C. with any convenient temperature ramp rate. The temperature is maintained for 6-18 hours after which the sample bomb is opened to vacuum to remove the water and dry the sieve. Of course the source of 5A, its calcium exchange level, type of binder, and previous hydrothermal history could alter the exact conditions of hydrothermal treatment needed to produce the 5A adsorbent of this invention. But this can be ascertained without undue experimentation.

Isotherm measurements of $CF_4$ and $NF_3$ on various forms of chabazite show clearly that at equilibrium, $CF_4$ adsorbs as well as $NF_3$, which would lead one to conclude that chabazites would not be viable adsorbents for an equilibrium-based preparative gas-solid chromatography separation of $CF_4$ and $NF_3$; note that the same is true for the pore-closed 5A molecular sieve. However, the $CF_4$ adsorption on these adsorbents is precluded when using them as a kinetic preparative gas-solid chromatography adsorbent in the process of this invention, and a large separation between $CF_4$ and $NF_3$ is unexpectedly obtained.

EXAMPLE 1

Untreated 5A Molecular Sieve

Figure 1:
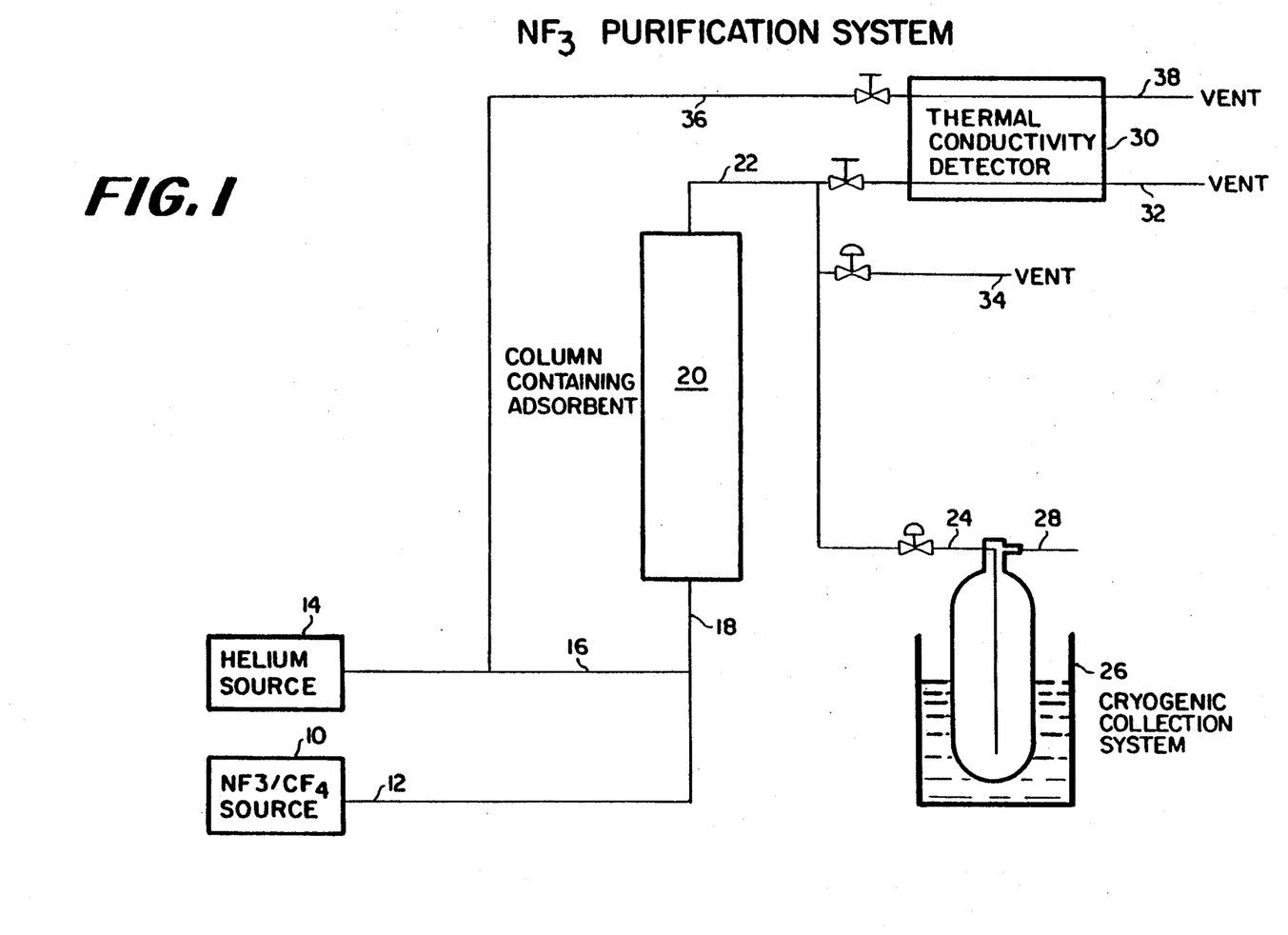
FIG. 1 is a schematic illustration of an $NF_3$ purification system useful for a preferred embodiment of the present invention.
Figure 2:
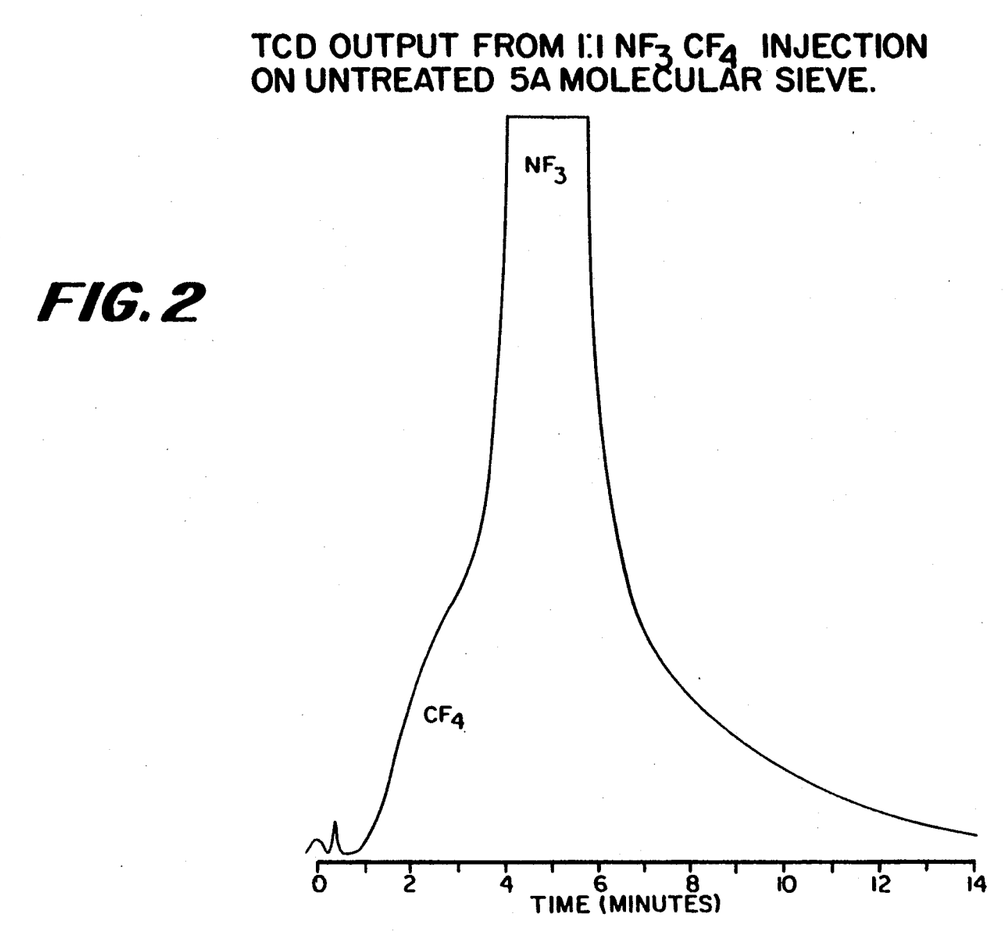
FIG. 2 is a thermal conductivity detector determination of a product output of an attempted chromatographic separation of $NF_3$ from $CF_4$ using an equilibrium based separation.

A schematic for the preparative gas-solid chromatography ("Prep GC") is shown in FIG. 1. With helium gas constantly flowing on the column at 3-5 L/min, 15 g of a gas sample which is a 1:1 mixture of $CF_4$ and $NF_3$ is allowed to flow onto the column. The components of the gas will have differing residence times on the column depending on the degree of interaction with the column packing material. The effluent from the column is monitored with a thermal conductivity detector (TCD). If the $CF_4$ and $NF_3$ elute at different times, then a Prep GC separation can be accomplished by directing the gas stream to a cryogenic condenser when the $NF_3$ elutes and venting the stream at all other times. The 2" OD×40" column is packed with 1 kilogram of untreated 5A molecular sieve. The observed output from the TCD is shown in FIG. 2. Clearly the $CF_4$ has not been separated from the $NF_3$ and so a Prep GC separation cannot be performed using untreated 5A molecular sieve.

EXAMPLE 2

Hydrothermal Treatment of 5A Molecular Sieve—Static Method 75 grams of thoroughly dry 5A molecular sieve was exposed to water vapor until the sieve had adsorbed 6% water by weight. The sieve was then placed in a 150 cc sample cylinder which was evacuated down to 0.1 torr pressure and sealed. The sample cylinder was then heated to 300° C. for 18 hours. The water was then removed from the sieve by opening the cylinder to a vacuum while still maintaining the 300° C. for 16 hours. Of course the source of 5A, its calcium exchange level, type of binder, and previous hydrothermal history could alter the exact conditions of hydrothermal treatment needed to produce the 5A adsorbent of this invention. But this can be ascertained without undue experimentation.

EXAMPLE 3

Hydrothermal Treatment of 5A Molecular Sieve—Flow Method

One kilogram of 5A molecular sieve was soaked in water and allowed to dry sufficiently at 50° C. to remove surface water so that the adsorbent could easily be transferred. The wetted sieve was placed in a 2" OD×40" column. Helium was flowed onto the column at a rate of 50 scc/min. The column was then heated to 300° C., ramping 15° C./min. The 300° C. temperature was maintained for 16 hours.

EXAMPLE 4

Hydrothermally Treated 5A Molecular Sieve

Figure 3:
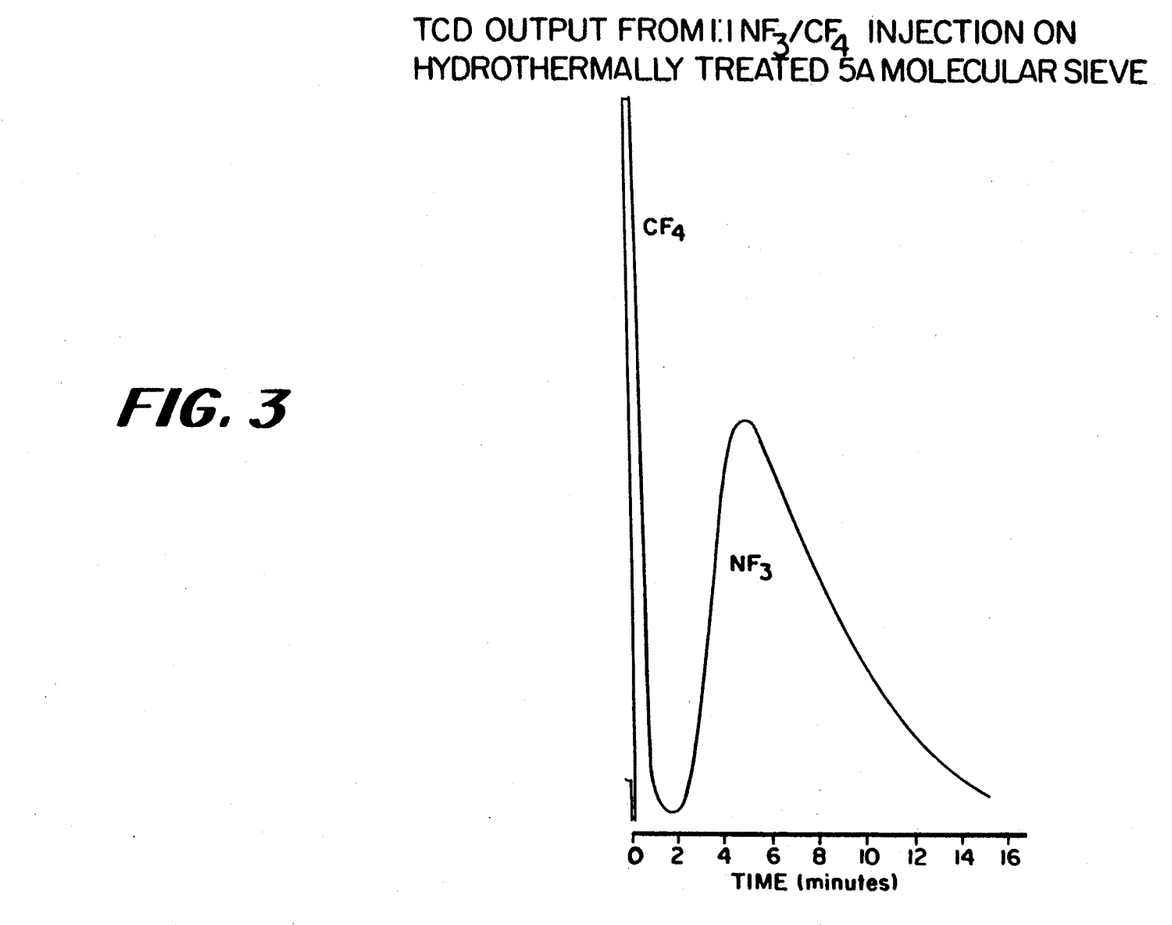
FIG. 3 is a thermal conductivity detector recorded output of the product of an embodiment of the present invention resolving $NF_3$ from $CF_4$.

The experiment described in Example 1 was performed except 1 kilogram of hydrothermally treated 5A molecular sieve prepared in accordance with the method outlined in Example 3 was packed in the column. The observed output from the TCD is shown in FIG. 3. The $CF_4$ is now sufficiently separated from the $NF_3$ to isolate a purified $NF_3$ product.

EXAMPLE 5

Effect of Calcium Loading on the Hydrothermal Treatment of 5A Molecular Sieve 100 grams of 5A molecular sieve were exchanged with calcium by refluxing for 16 hours in 1L 1M $CaCl_2$. The exchange solution was decanted off and an additional liter of 1M $CaCl_2$ was added and again refluxed for 16 hours. Previous experience has shown that this procedure is sufficient to produce calcium exchange level >90%. This sieve was then hydrothermally treated by the same method outlined in Example 2 except the sieve initially contained 8% water by weight. The experiment described in Example 1 was performed except the 100 grams of sieve was placed in a ½" OD×40" column and 2 grams of the 1:1 $CF_4/NF_3$ gas mixture was flowed onto the column. The chromatography as determined by TCD output was essentially unchanged from that observed in Example 4.

EXAMPLE 6

Isotherm of $CF_4$ on Hydrothermally Treated 5A Molecular Sieve

Figure 4:
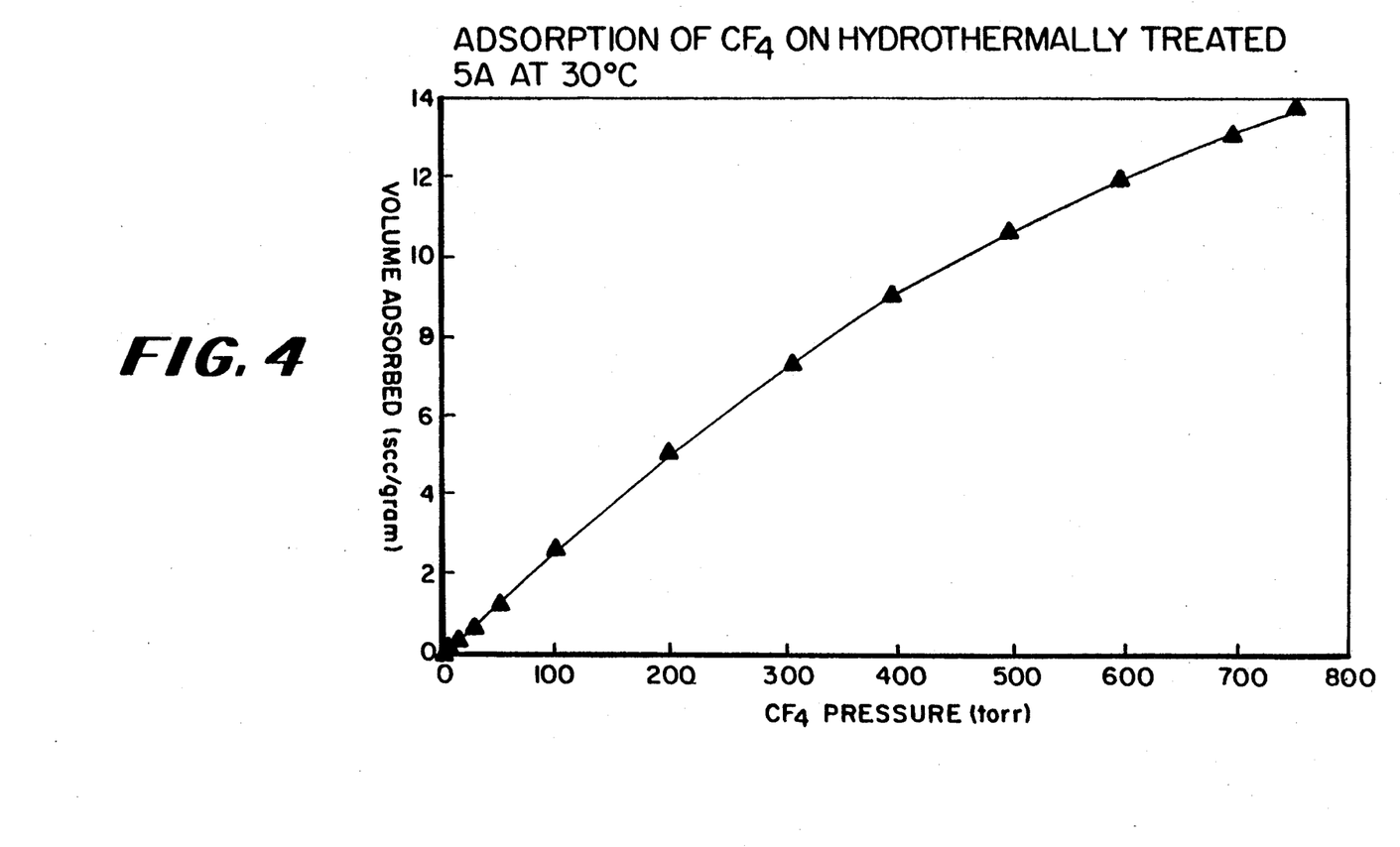
FIG. 4 is the adsorption isotherm for $CF_4$ on hydrothermally treated 5A molecular sieve at 30° C.

The adsorption isotherm of $CF_4$ over 5A molecular sieve hydrothermally treated in accordance with the method outlined in Example 3 was determined at 30° C. by measuring the amount of gas adsorbed per gram of adsorbent at several pressures between 0 and 1 atmosphere pressure. The result is shown in FIG. 4. Adsorption of $CF_4$ at equilibrium is clearly shown at this temperature.

EXAMPLE 7

Preparative Gas Chromatography Using the Hydrothermally Treated 5A Molecular Sieve Adsorbent The experiment described in Example 4 was performed, except when the $NF_3$ was detected to be eluting from the column, the gas flow was directed towards a cryogenic collection system. The feed gas was $NF_3$ which contained 1200 ppm $CF_4$. 25 grams of $NF_3$ were injected over 15 injections. The 23 grams of collected $NF_3$ contained 20 ppm $CF_4$ amounting to an overall $NF_3$ purity of 99.99%.

EXAMPLE 8

Isotherms of $CF_4$ and $NF_3$ on Chabazite.

Figure 5:
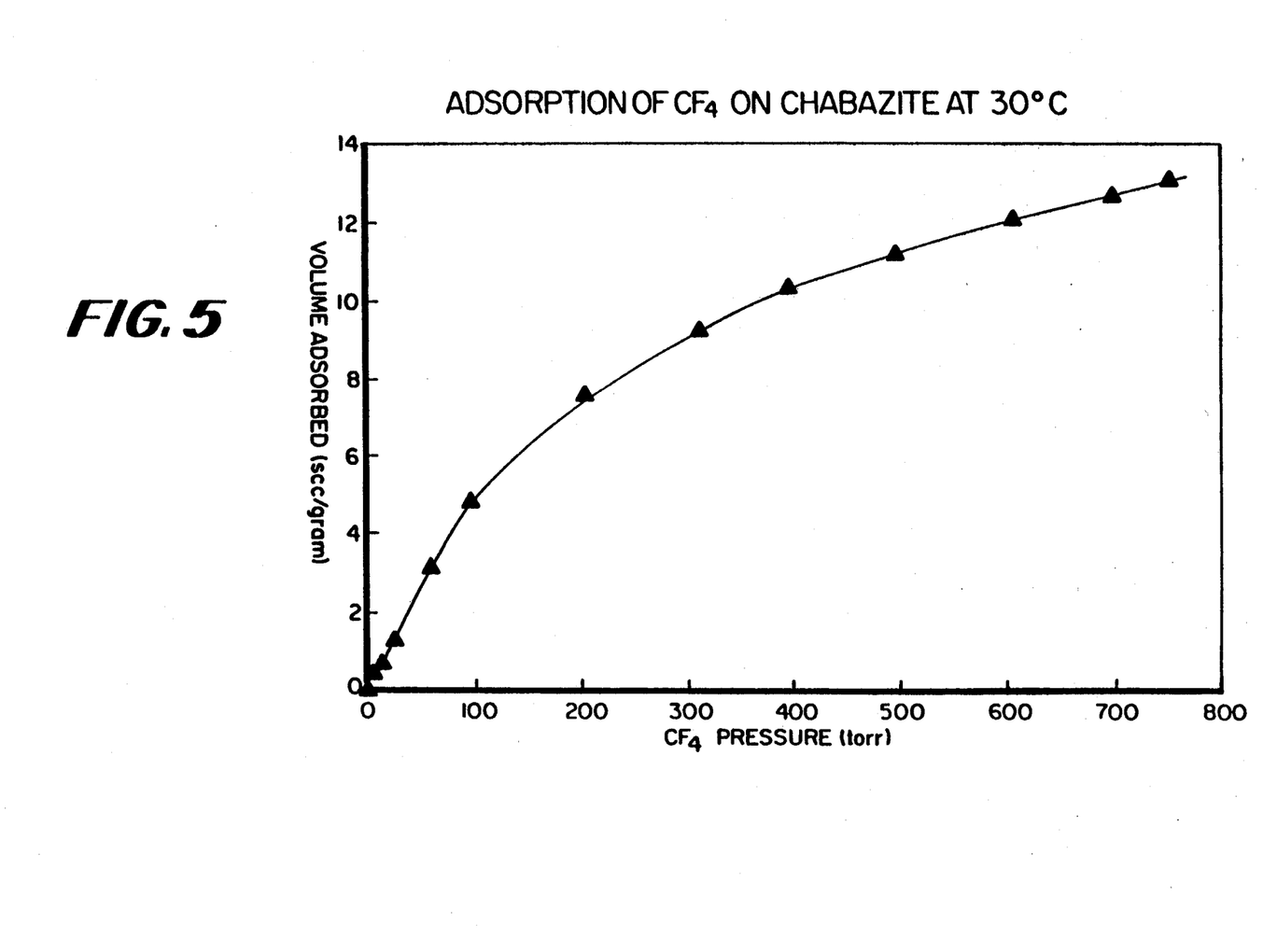
FIG. 5 is the adsorption isotherm for $CF_4$ on chabazite (Linde AW-500) at 30° C.
Figure 6:
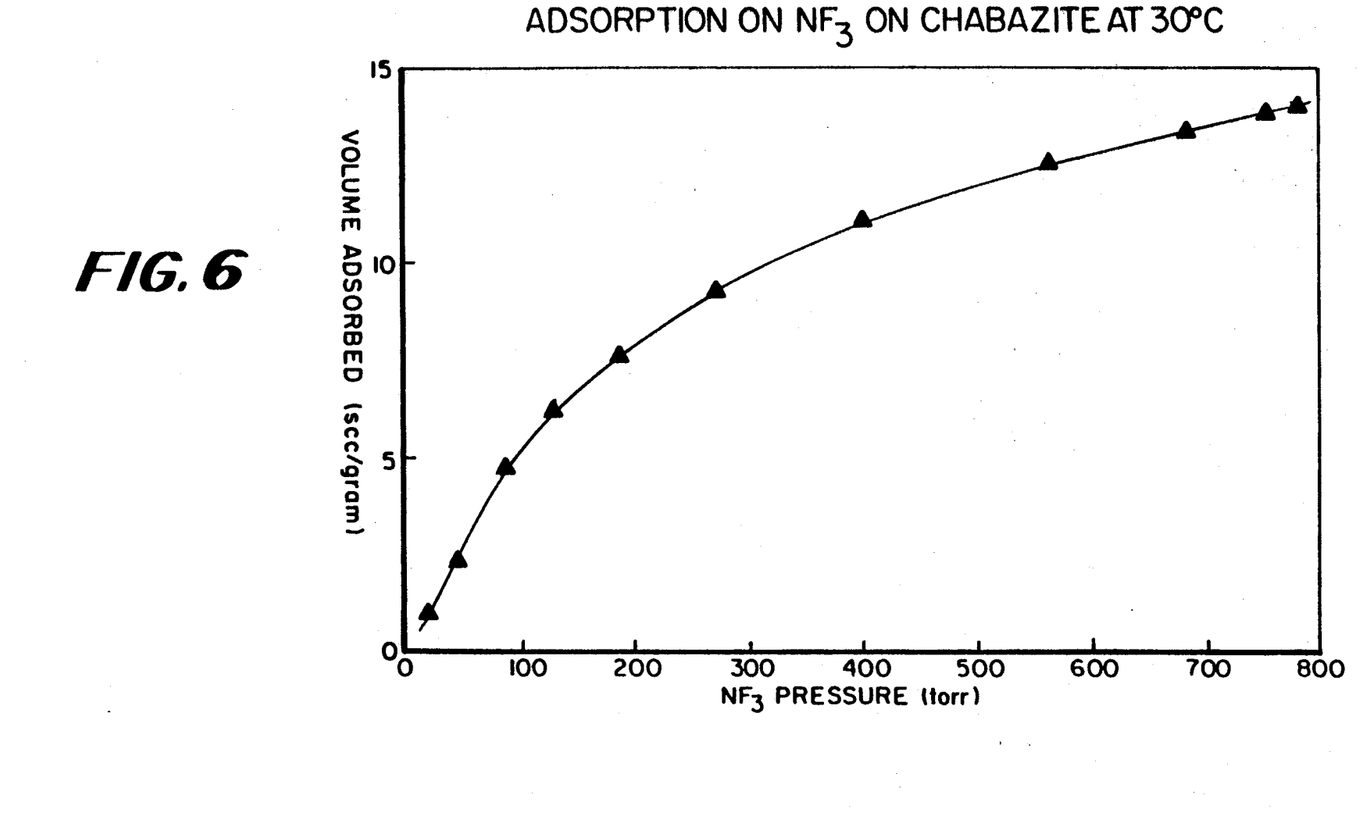
FIG. 6 is the adsorption isotherm for $NF_3$ on chabazite (Linde AW-500) at 30° C.

The adsorption isotherms of $CF_4$ and $NF_3$ over chabazite were determined at 0° C. and 30° C. by measuring the amount of gas adsorbed per gram of chabazite at several pressures between 0 and 1 atmosphere pressure. The results for 30° C. for $NF_3$ and $CF_4$ are shown in FIGS. 5 and 6, respectively. $NF_3$ adsorption is clearly shown in FIG. 6, and $CF_4$ is adsorbed about as much as $NF_3$ at this temperature (FIG. 5).

EXAMPLE 9

Chabazite

Figure 7:
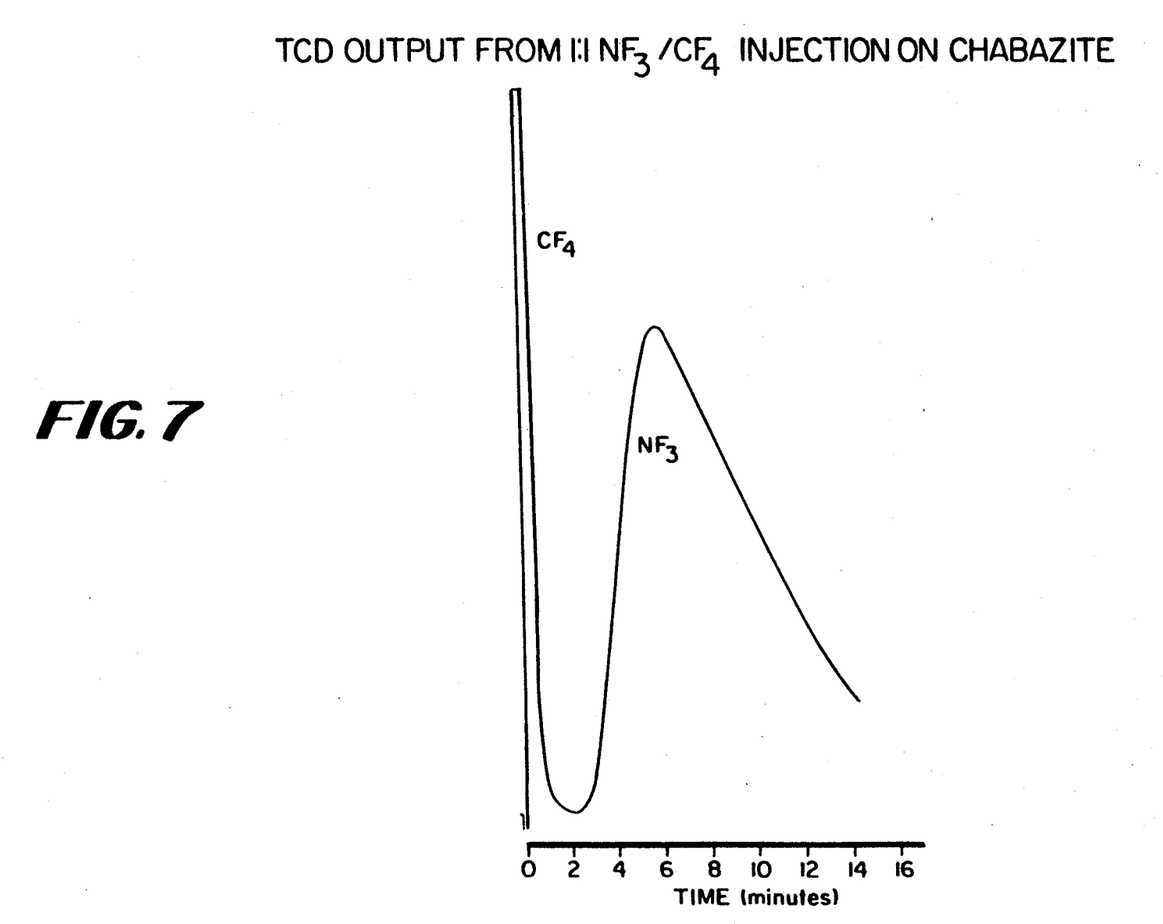
FIG. 7 is a thermal conductivity detector output graph of the process of the present invention for separating $NF_3$ from $CF_4$ on chabazite.

The process described in Example 1 was performed except 1 kilogram of chabazite (Linde AW-500) was packed in the column. The observed output from the TCD is shown in FIG. 7. The $CF_4$ is sufficiently separated from the $NF_3$ to isolate a purified $NF_3$ product even though at equilibrium, at this temperature, $CF_4$ is adsorbed on chabazite to the same extent as $NF_3$.

EXAMPLE 10

Preparative Gas Chromatography Using the Chabazite Adsorbent

The experiment described in Example 9 was performed, except when the $NF_3$ was detected to be eluting from the column, the gas flow was directed towards a cryogenic collection system. The feed gas was $NF_3$ which contained 1200 ppm $CF_4$. 30 grams of $NF_3$ were injected over 20 injections. The 27 grams of collected $NF_3$ contained 25 ppm $CF_4$ amounting to an overall $NF_3$ purity of 99.99%.

EXAMPLE 11

Preparation of 99.999% $NF_3$

The experiment described in Example 10 was performed except the column used was a 6" ID×60" column packed with 50 lbs of chabazite (Linde AW-500). The feed $NF_3$ contained 400 ppm $CF_4$. 8.9 lbs of $NF_3$ were injected over 36 injections. The 8.2 lbs. of $NF_3$ recovered contained 12 ppm $CF_4$. 6.9 lbs of purified $NF_3$ were then re-injected onto the column over 28 injections. The now twice purified 4.6 lbs. of recovered $NF_3$ contained less than 1 ppm $CF_4$ amounting to an overall $NF_3$ purity exceeding 99.999%.

EXAMPLE 12

Isolation of $NF_3$ From a Mixture of 70% $CF_4$ and 30% $NF_3$

The experiment described in Example 10 was performed except the feed gas was a mixture which was 70% $CF_4$ and 30% $NF_3$. 185 grams of the mixture were injected over 10 injections. The 40 grams of $NF_3$ collected contained 2% $CF_4$; thus the percent reduction of $CF_4$ (approximately 97%) was about the same as was seen in Examples 7 and 10. This material could be further purified to high purity $NF_3$ as was described in Example 11. The 110 grams of $CF_4$ collected contained less than 1% $NF_3$.

EXAMPLE 13

The Effect of Flow and Composition on the Separation of $CF_4$ from $NF_3$

Figure 8:
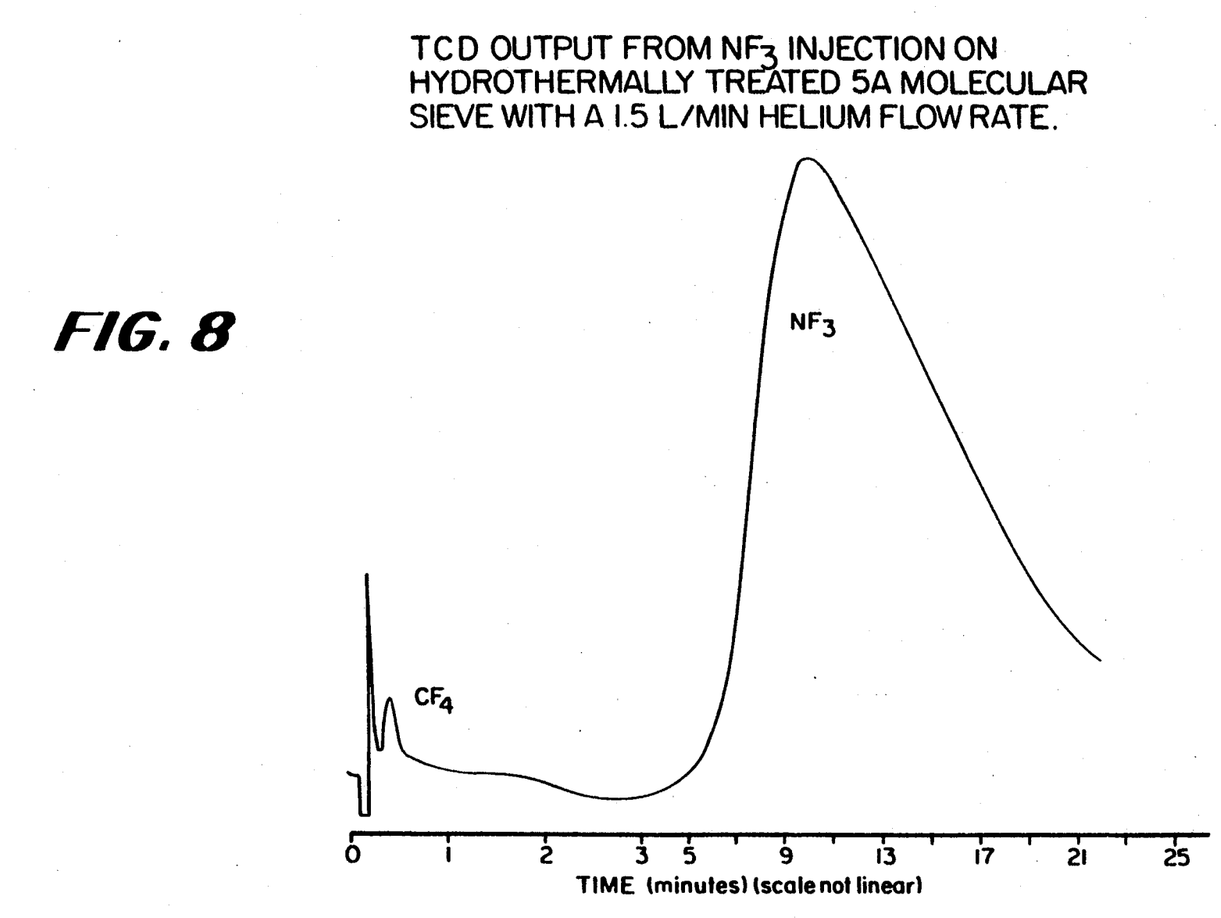
FIG. 8 is a thermal conductivity detector output graph of an $NF_3$—$CF_4$ resolution at flow rates below kinetic mechanism operation showing reduced resolution.

The experiment described in Example 7 was performed except the helium flow was set at 1.5 L/min. The output of the TCD is shown in FIG. 8. The feed gas was $NF_3$ which contained 1200 ppm $CF_4$. 40 grams of $NF_3$ were injected over 28 injections. The 36 grams of collected $NF_3$ contained 107 ppm $CF_4$. Even though the chromatographic separation of $CF_4$ and $NF_3$ is greater with the reduced carrier gas flow (compare FIG. 8 with FIG. 3), the collected $NF_3$ contained more $CF_4$ than when the helium carrier gas flow was greater as shown in Example 7.

EXAMPLE 14

The Effect of Temperature on the Purification of $NF_3$

The experiment described in Example 10 was performed except the column temperature was maintained at 60° C. The $NF_3$ collected contained 406 ppm nitrogen and 495 ppm nitrous oxide. Presumably the nitrogen and nitrous oxide resulted from the reaction of $NF_3$ with the adsorbent.

The exact mechanism of the hydrothermal pore reduction of 5A molecular sieve has not been determined; however experiments which measure the effective pore opening of untreated and hydrothermally treated 5A molecular sieve have been conducted which show that the hydrothermal treatment reduces the effective pore diameter of 5A molecular sieve by at least 0.3 Å. This reduction is sufficient to totally exclude $CF_4$ from entering the zeolite crystal under the process of this invention.

The pore opening is not reduced sufficiently to exclude $NF_3$ and so $NF_3$ is still adsorbed. This gives rise to the unexpectedly large kinetic mechanism chromatographic separation between $CF_4$ and $NF_3$.

The isotherms of $CF_4$ adsorption clearly show that at equilibrium $CF_4$ adsorbs onto chabazite. The extent of adsorption is about the same as that for $NF_3$. Because Prep GC is regarded as an adsorption process which operates at equilibrium, $CF_4$ and $NF_3$ should not be separated; yet, when chabazite is used for a Prep GC adsorbent, $CF_4$ is not adsorbed and is effectively separated from the $NF_3$, which is strongly adsorbed. Apparently, the $CF_4$ adsorption on chabazite is too slow to occur on the Prep GC time scale.

The use of hydrothermally pretreated 5A zeolite molecular sieve or chabazites in the kinetic mechanism of operation recited in the present invention for a gas-solid chromatographic process overcomes the disadvantages of the prior art and unexpectedly gives an efficient resolution of the closely physical property matched $NF_3$ and $CF_4$ molecules to give a bulk or volume separation of high efficiency and high purity of $NF_3$ of 99.99% or better.

The general process of this invention may be extended to other gas separations of interest and can be directly applicable to use for both bulk separation and purification applications. Having demonstrated the effective separation of $CF_4$ from $NF_3$ using the process of this invention, one could apply this process to other gas separations using the appropriate adsorbent for the separation of interest. The combination of the properly sized adsorbent for the molecule sizes to be separated with the present kinetic gas-solid chromatographic method using an inert carrier gas provides a unique way of separating and purifying gases. This method is particularly applicable to the isolation of specialty gases such as $SF_6$ from $C_2F_6$ and $C_2F_6$ from $CF_4$. However, with the appropriate engineering and recycle of the inert carrier gas, it is possible to extend this method of separation to more traditional industrial gas processing, such as removing nitrogen from methane, oxygen from argon, nitric oxides from xenon, and paraffins from olefins. This method of separation can be applicable to any mixture of gases or vapors which have different kinetic uptake rates on a specific adsorbent under a given set of conditions.

The present invention has been described with regard to various particular embodiments but the scope of the invention should be ascertained by the claims below.

We claim:

1. A method of recovering a purified first component from a mixture of at least first component and second component using gas-solid chromatography comprising passing discrete pulses of a mixture of the first and second component in a continuous flow of an inert carrier gas through a bed of porous adsorbent that kinetically adsorbs one component more readily than the other component and having an effective pore window sufficient for kinetic differentiation of the components at an appropriate mass velocity for a kinetic separation and separately recovering the first component from the bed as product first component having a reduced content of the second component.

2. A method for separately recovering $NF_3$ and/or $CF_4$ from a mixture of $NF_3$ and $CF_4$ comprising passing a mixture of $NF_3$ and $CF_4$ in an inert carrier gas through a zone of porous adsorbent, that differentially adsorbs and separates $NF_3$ from $CF_4$, having an effective pore window between that of 4A and 5A molecular sieves, at a mass velocity of at least 1.0 g/sq cm-hr and a zone temperature less than approximately 100° C. and separately recovering $NF_3$ and/or $CF_4$ from the zone, each having a reduced content of the other component.

3. The method of claim 2 wherein the mixture of $NF_3$ and $CF_4$ are passed through the zone in discrete pulses as a continuous flow of the carrier gas.

4. The method of claim 2 wherein the adsorbent is a hydrothermally pretreated 5A zeolitic molecular sieve.

5. The method of claim 4 wherein a 5A zeolitic molecular sieve is hydrotreated by soaking in water, and then heating in an inert atmosphere at approximately 300° C. for approximately 6-18 hours.

6. The method of claim 2 wherein the adsorbent is a chabazite.

7. The method of claim 2 wherein the separation is conducted under conditions by which a kinetic mechanism of the relative adsorption of the $NF_3$ and $CF_4$ on the adsorbent is performed.

8. The method of claim 2 wherein the effective pore window approximately 4.4 Å to 4.8 Å.

9. The method of claim 2 wherein the effective pore window is approximately 4.6 Å.

10. The method of claim 2 wherein the zone temperature is in the approximate range of 0° C. to 60° C.

11. The method of claim 2 wherein the zone temperature is approximately 30° C.

12. The method of claim 2 wherein the mass velocity is in the range of 2.5 to 8.6 g/sq cm-hr.

13. The method of claim 2 wherein the purity of the recovered $NF_3$ is at least 99.99% $NF_3$.

14. The method of claim 2 wherein the purity of the recovered $CF_4$ is at least 99.99% $CF_4$.

15. The method of claim 2 wherein the inert carrier gas is selected from the group consisting of helium, argon, nitrogen, and hydrogen.

16. The method of claim 2 wherein the recovered $NF_3$ is conducted through additional passes of such adsorbent.

17. The method of claim 2 wherein the recovered $CF_4$ is conducted through additional passes of such adsorbent.

18. A method of recovering purified $NF_3$ from a mixture of $NF_3$ and $CF_4$ using gas-solid chromatography comprising passing discrete pulses of a mixture of $NF_3$ and $CF_4$ in a continuous flow of an inert carrier gas through a bed of porous adsorbent that kinetically adsorbs $NF_3$ more readily than $CF_4$ selected from the group consisting of hydrothermally pretreated 5A zeolitic molecular sieve and chabazite and having an effective pore window in the range of 4.4 Å to 4.8 Å, at a mass velocity of to 2.5 to 8.6 g/sq cm-hr and a zone temperature in the range of 0° to 60° C. and separately recovering the $NF_3$ from the bed as product $NF_3$ having a purity of at least 99.99% $NF_3$.

* * * * *